United States Patent
Ho (10) Patent No.: US 11,301,085 B2
(45) Date of Patent: Apr. 12, 2022

(54) TOUCH SENSITIVE PROCESSING METHOD AND APPARATUS AND TOUCH SYSTEM

(71) Applicant: EGALAX_EMPIA TECHNOLOGY INC., Taipei (TW)

(72) Inventor: Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/350,193

(22) Filed: Jun. 17, 2021

(65) Prior Publication Data

US 2021/0397344 A1 Dec. 23, 2021

(30) Foreign Application Priority Data

Jun. 17, 2020 (TW) ................................ 109120594

(51) Int. Cl.
 *G06F 3/041* (2006.01)
 *G06F 3/044* (2006.01)

(52) U.S. Cl.
 CPC ...... *G06F 3/041662* (2019.05); *G06F 3/0418* (2013.01); *G06F 3/0443* (2019.05); *G06F 3/0446* (2019.05)

(58) Field of Classification Search
 CPC .... G06F 3/0446; G06F 3/0443; G06F 3/0418; G06F 3/041662

USPC .................................................. 345/173, 174
See application file for complete search history.

(56) References Cited

U.S. PATENT DOCUMENTS

| | | | | |
|---|---|---|---|---|
| 8,298,327 | B2* | 10/2012 | Benjamin | A23C 19/163 347/100 |
| 10,126,863 | B2* | 11/2018 | Noguchi | G09G 3/3648 |
| 10,126,894 | B2* | 11/2018 | Yeh | A63D 15/20 |
| 10,664,094 | B2* | 5/2020 | Koide | G06F 3/04166 |

* cited by examiner

*Primary Examiner* — Calvin C Ma
(74) *Attorney, Agent, or Firm* — WPAT, PC (57) ABSTRACT

A touch sensitive processing method applicable to a touch panel is provided. The touch panel includes sequentially a third electrode layer, a flexible dielectric layer, and at least one touch electrode layer. The third electrode layer includes multiple parallel third electrodes. The at least one touch electrode layer includes first electrodes in parallel to a first axis and second electrodes in parallel to a second axis. Each of the first electrodes intersects with the second electrodes to form multiple intersections. The touch sensitive processing method comprises: performing self-capacitance detection via the third electrodes to retrieve an approximating event, performing mutual-capacitance detection via the first electrodes and the second electrodes to retrieve a touching event, and reporting the approximating event to a host if the touching event is detected, or reporting the touching event if it is detected.

15 Claims, 6 Drawing Sheets

TOUCH SENSITIVE PROCESSING METHOD AND APPARATUS AND TOUCH SYSTEM

CROSS REFERENCE TO RELATED PATENT APPLICATION

This patent application is based on a Taiwan, R.O.C. patent application No. 109120594 filed on Jun. 17, 2020.

FIELD OF THE INVENTION

The present invention relates to touch sensitive technique, and more particularly, to touch screen for determining whether an external conductive object is approximating or touching and related techniques.

BACKGROUND OF THE INVENTION

Modern electronic systems equipping with touch panels or touch screens are increasing common. Hereinafter, the present application uses the term touch screen to refer to touch panel and touch screen. User can use an external conductive object approximating or touching a touch screen to create an approximating or touching event to input information. In order to increase functionalities, electronic systems can react differently in respect to an approximating event and a touching event.

However, when an external conductive object approximating or touching a capacitance sensing touch screen, traditional touch sensitive processing apparatus cannot distinguish whether the detected event is an approximating event or a touching event. Thus, there exists a need of a touch screen for determining whether an external conductive object is approximating or touching and related techniques.

SUMMARY OF THE INVENTION

An objective of the present invention is to provide

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to one embodiment of the present application, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first, the second and the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to an embodiment of the present invention, a touch system is provided. The touch system comprising the aforementioned touch panel and the touch sensitive processing apparatus.

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get a first one-dimensional array composing sensing information corresponding to each of first ends of the third electrodes, and performing self-capacitance sensing via the third electrodes in order to get a second one-dimensional array composing sensing information corresponding to each of second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to an embodiment of the present invention, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first electrodes, the second electrodes, first ends and second ends of the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get a first one-dimensional array composing sensing information corresponding to each of the first ends of the third electrodes, and have the driving circuit module and the sensing circuit module through the interconnection network performing self-capacitance sensing via the third electrodes in order to get a second one-dimensional array composing sensing information corresponding to each of the second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

According to an embodiment of the present invention, a touch system is provided. The touch system comprising the aforementioned touch panel and the touch sensitive processing apparatus.

The touch system, the touch sensitive processing apparatus and method provided by the present application can distinguish whether the external conductive object approximates or contacts the touch screen so as the host can increase types of responsive activities with respect to different kinds of input corresponding to one position. Thus, the functionalities of the touch system are increased to enrich user's experience.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Figure 1:
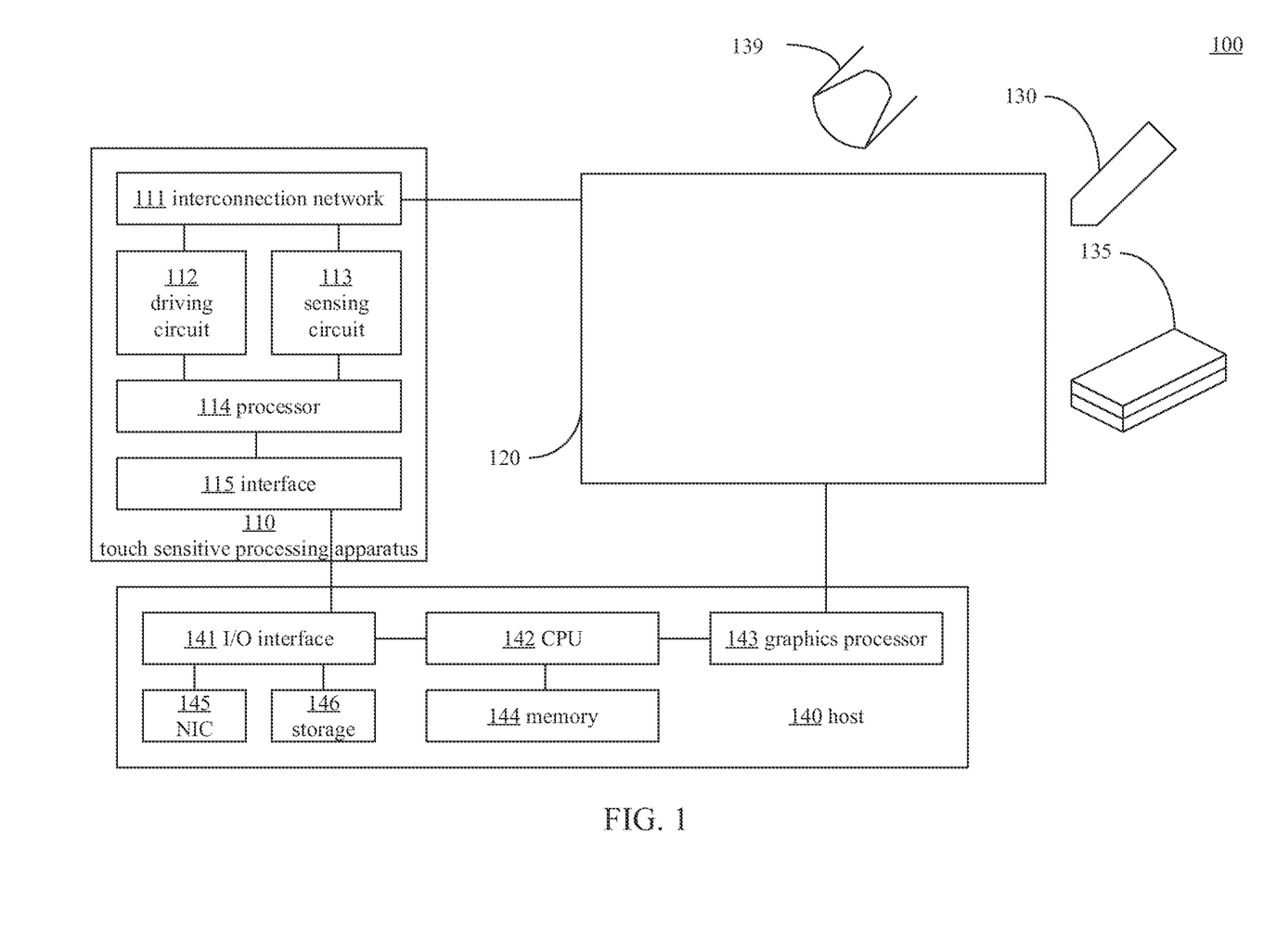
FIG. 1 shows a block diagram of a touch sensitive system in accordance with an embodiment of the present invention.

Please refer to FIG. 1, which shows a block diagram of a touch sensitive system 100 in accordance with an embodiment of the present invention. The touch sensitive system 100 may be normal desktop, laptop, tablet personal computer, industrial control computer, smart phone or any other computer system with touch sensitive function.

The touch sensitive system 100 may comprise a touch sensitive processing apparatus 110, a touch panel or touch screen 120 coupled to the touch sensitive processing apparatus 110 and a host 140 coupled to the touch sensitive processing apparatus 110. The touch sensitive system 100 may further comprises one or more styli 130 and/or touch board erasers 135. Hereinafter, the touch panel or screen 120 may be collectively referred as touch screen 120. However, in embodiments which are lack of display function, person has ordinary skill in the art can understand that the touch screen denoted in the present application is actually a touch panel.

The touch screen 120 comprises first electrodes 121 in parallel to a first axis and second electrodes 122 and one or more third electrodes 123 in parallel to a second axis. The first electrode 121 intersects with multiple of the second electrodes 122 in order to form multiple sensing points or areas. Similarly, the second electrode 122 intersects with multiple of the first electrodes 121 in order to form multiple sensing points or areas. In some embodiment, the present application uses first touch electrodes 121 to refer to the first electrodes 121, uses second touch electrodes 122 to refer to the second electrodes 122 and uses third touch electrodes 123 to refer to the third electrodes 123. The present application also calls touch electrodes to refer to the first electrodes 121, the second electrodes 122 and the third electrodes 123 collectively. In some embodiments, the first electrodes 121, the second electrodes 122 and the third electrodes 123 may be made by transparent materials. The first electrodes 121 and the second electrodes 122 may be placed in one electrode layer. Multiple conductive plates of each of the first electrodes 121 or the second electrodes 122 may be connected by bridging. Alternatively, the first electrodes 121 and the second electrodes 122 may be placed in two overlaid electrode layers. Unless specified particularly, the present application usually is applicable to single-layer or multiple-layer embodiments. The first axis is usually perpendicular to the second axis. However, the present application does not limit that the first axis has to be perpendicular to the second axis. In one embodiment, the first axis may be the horizontal axis or a refresh axis of the touch screen 120.

Figure 2A:
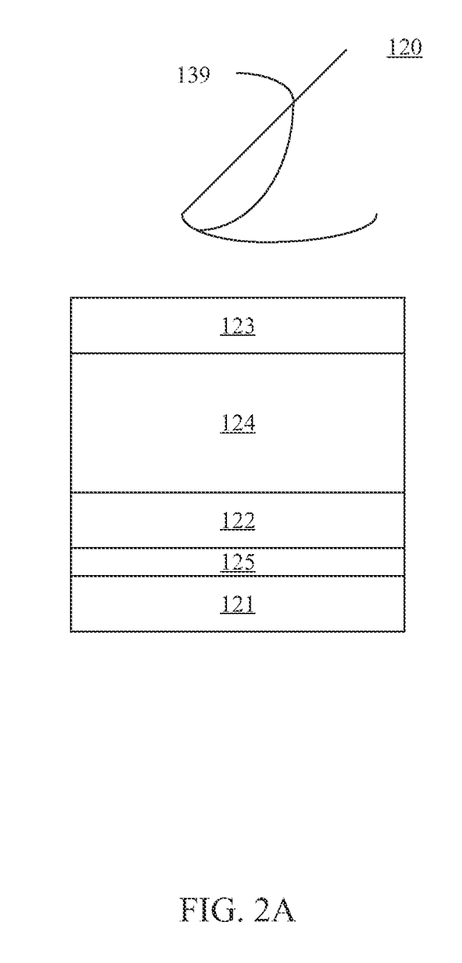
FIGS. 2A through 2C show profile diagrams of a touch screen 120 in accordance with three embodiments of the present invention.

Please refer to FIG. 2A, which shows a profile diagram of a touch screen 120 in accordance with an embodiment of the present invention. The touch screen 120 includes an aforementioned structure, which sequentially includes a layer of the third electrodes 123, an elastic dielectric layer 124, a layer of the second electrodes 122, a dielectric layer 125 and a layer of the first electrodes 121. Person having ordinary skill in the art can understand that the touch screen may include other display structures or layers. However, in order to describe the present invention clearly, the other display structures or layers are omitted.

External conductive objects 139 such as fingers are closest to the layer of third electrodes 123. The elastic dielectric layer 123 is sandwiched by the layer of third electrodes 123 and the layer of second electrodes 122. It is configured to insulate the second electrodes 122 from the third electrodes 123. When an external conductive object 139 touches the touch screen 120 downwardly, the layer of third electrodes 123 and the elastic dielectric layer 124 are deformed by the downward force. Hence, the distance between the layer of third electrodes 123 and the layer of second electrodes 122 is shorten accordingly. The capacitances between the second electrodes 122 and the third electrodes 123 are changed in response to the change of the distance.

Figure 2B:
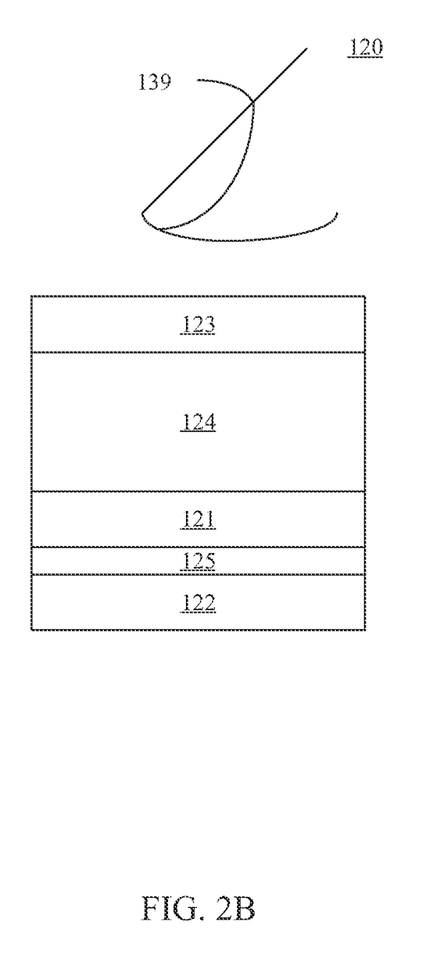

Please refer to FIG. 2B, which shows a profile diagram of a touch screen 120 in accordance with an embodiment of the present invention. Comparing with the embodiment as shown in FIG. 2A, the layer of first electrodes 121 and the layer of second electrodes 122 interchanges their places. The elastic dielectric layer 123 is sandwiched by the layer of third electrodes 123 and the layer of first electrodes 121. It is configured to insulate the first electrodes 121 from the third electrodes 123. When an external conductive object 139 touches the touch screen 120 downwardly, the layer of third electrodes 123 and the elastic dielectric layer 124 are deformed by the downward force. Hence, the distance between the layer of third electrodes 123 and the layer of first electrodes 121 is shorten accordingly. The capacitances between the first electrodes 121 and the third electrodes 123 are changed in response to the change of the distance.

Figure 2C:
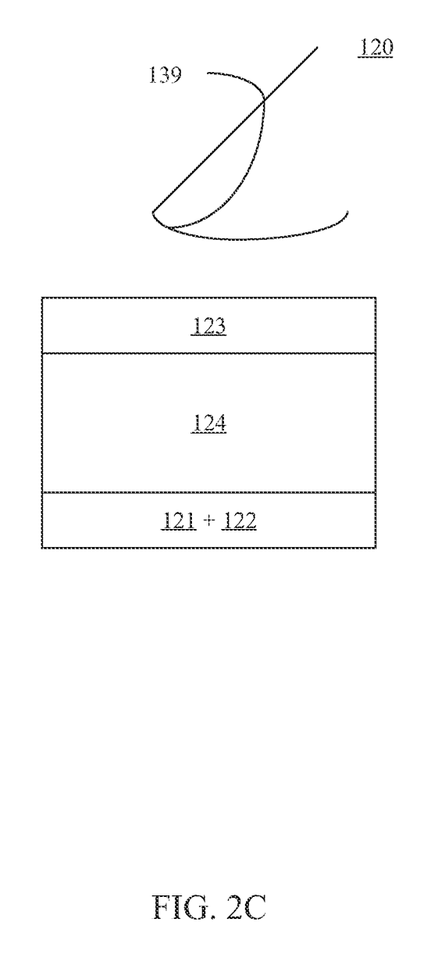

Please refer to FIG. 2C, which shows a profile diagram of a touch screen 120 in accordance with an embodiment of the present invention. Comparing with the embodiments as shown in FIGS. 2A and 2B, the first electrodes 121 and the second electrodes are disposed in one layer. Multiple conductive plates of each of the first electrodes 121 or each of the second electrodes 122 are connected by bridging. When an external conductive object 139 touches the touch screen 120 downwardly, the layer of third electrodes 123 and the elastic dielectric layer 124 are deformed by the downward force. Hence, the distance between the layer of third electrodes 123 and the layer of first electrodes 121 and the second electrodes 122 is shorten accordingly. The capacitances between the first electrodes 121 and the third electrodes 123 are changed in response to the change of the distance. The capacitances between the second electrodes 122 and the third electrodes 123 are also changed in response to the change of the distance.

In the embodiment as shown in FIG. 2A, since the layer of third electrodes 123 is closer to the layer of second electrodes 122, the third electrodes 123 may be with the first electrodes 121 in parallel to the first axis. In the embodiment as shown in FIG. 2B, since the layer of third electrodes 123 is closer to the layer of first electrodes 121, the third electrodes 123 may be with the second electrodes 122 in parallel to the second axis. However, the present application does not limit the third electrodes 123 being arranged to a different direction from its immediate underlying electrode layer.

The touch sensitive processing apparatus 110 may comprise following hardware circuit modules: an interconnection network module 111, a driving circuit module 112, a sensing circuit module 113, a processor module 114, and an interface module 115. The touch sensitive processing apparatus 310 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 110 and the host 140 may be implemented in the same integrated circuits, or in the same chip. In other words, the present application does not limit how to implement the touch sensitive processing apparatus 110.

The interconnection network module 111 is configured to connect each of the multiple first electrodes 121, the multiple second electrodes 122 and/or the multiple third electrodes 123 of the touch screen 120. The interconnection network module 111 may accept control command of the processor module 114 for connecting the driving circuit module 112 and any one or more touch electrodes and for connecting the sensing circuit 113 and any one or more touch electrodes. The interconnection network module 111 may include a combination of one or more multiplexers (MUX) to realize the aforementioned functions.

Figure 3A:
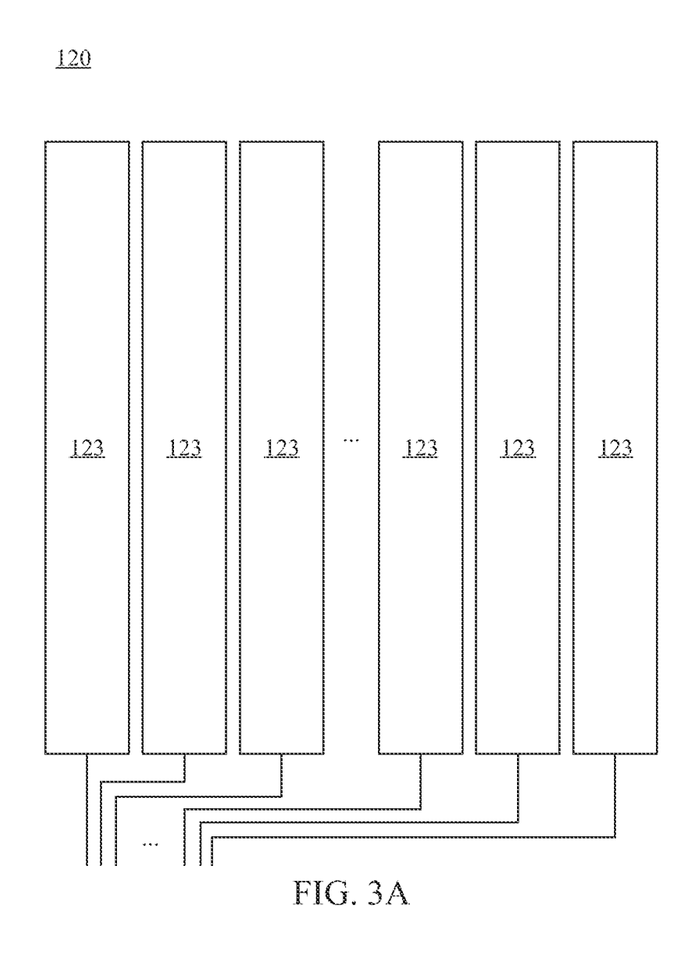
FIGS. 3A and 3B depict top views of the layers of third electrodes according to two embodiments of the present invention, respectively.
Figure 3B:
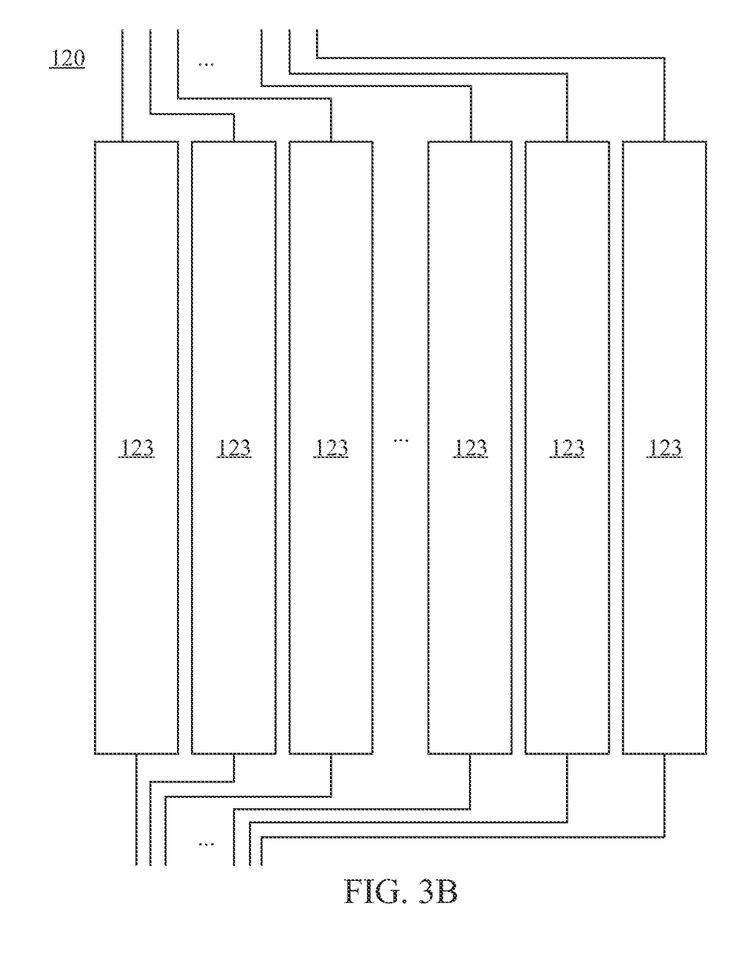

Please refer to FIGS. 3A and 3B which depict top views of the layers of third electrodes according to two embodiments of the present invention, respectively. The third electrodes 123 as shown in FIGS. 3A and 3B are in parallel to the first axis or the second axis. The total area of all the third electrodes 123 may occupy a percentage of the total area of the touch screen, where the percentage may be 80%, 85%, 90% or 90%. Why the percentage of the third electrodes 123 is so high would be provided in following paragraphs.

Each of the third electrodes 123 as shown in FIG. 3A connects with the interconnection network module 111 via a circuit coupled to an end of the third electrode 123. This kind of connection is named as "single routing." Each of the third electrodes 123 as shown in FIG. 3B connects with the interconnection network module 111 via circuits coupled to both ends of the third electrode 123. The kind of connection is named as "double routing." The interconnection network module 111 may connect the driving circuit module 112 and/or the sensing circuit module 113 with both ends of the third electrode 123 via the "double routing" connection.

Figure 4:
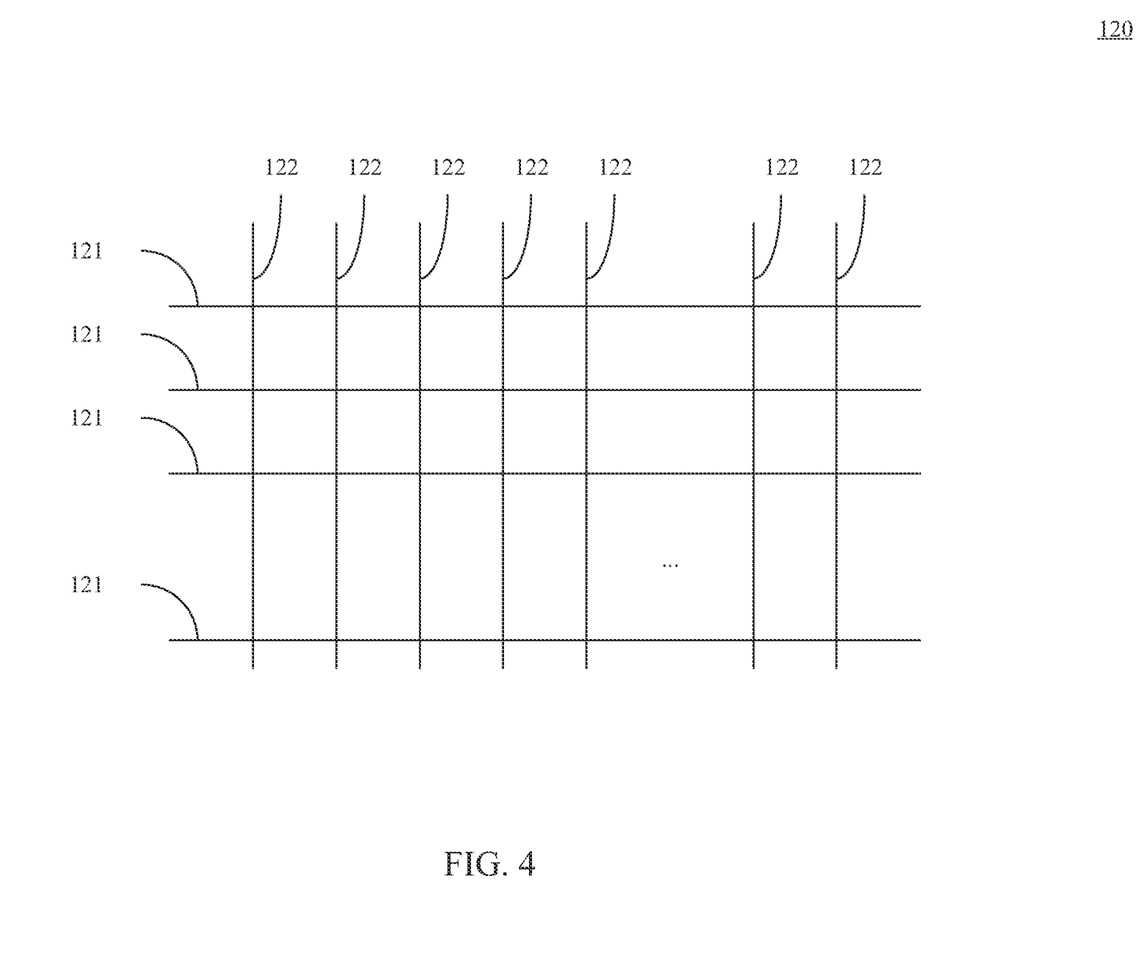
FIG. 4 illustrates a diagram of first electrodes and second electrodes in accordance with an embodiment of the present invention.

Please refer to FIG. 4, which illustrates a diagram of first electrodes and second electrodes in accordance with an embodiment of the present invention. FIG. 4 is a top view of the touch screen 120. When viewing the three structures of the touch screens as shown in FIGS. 2A through 2C from top, it would be shown in FIG. 4. The interconnection network module 111 may connect the driving circuit module 112 and/or the sensing circuit module 113 with one or more of the first electrodes 121 or the second electrodes 122, respectively. The present application does not limit whether it uses "single routing" or "double routing" to connect with the first electrodes 121 and the second electrodes 122.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 313 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 314.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), $I^2C$, peripheral component interconnect (PCI), PCI-Express, IEEE 1394 and other industrial standard input/output interface. The touch sensitive processing apparatus 110 connects to the host 140 via the interface module 115.

The touch system 300 may comprise one or more styli 130 and/or touch erasers 135. The stylus 130 and touch eraser 135 may be transmitters which emit electrical signals. The transmitters may include active transmitter which actively emits electrical signals or passive transmitter which emits electrical signals in response to outside electrical signals. The stylus 130 and touch eraser 135 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects 139 such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 330 or touch erasers 335 and touch sensitive processing apparatus 110 may use the aforementioned modulation and demodulation methods to transmit message via the electrical signals. The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 5:
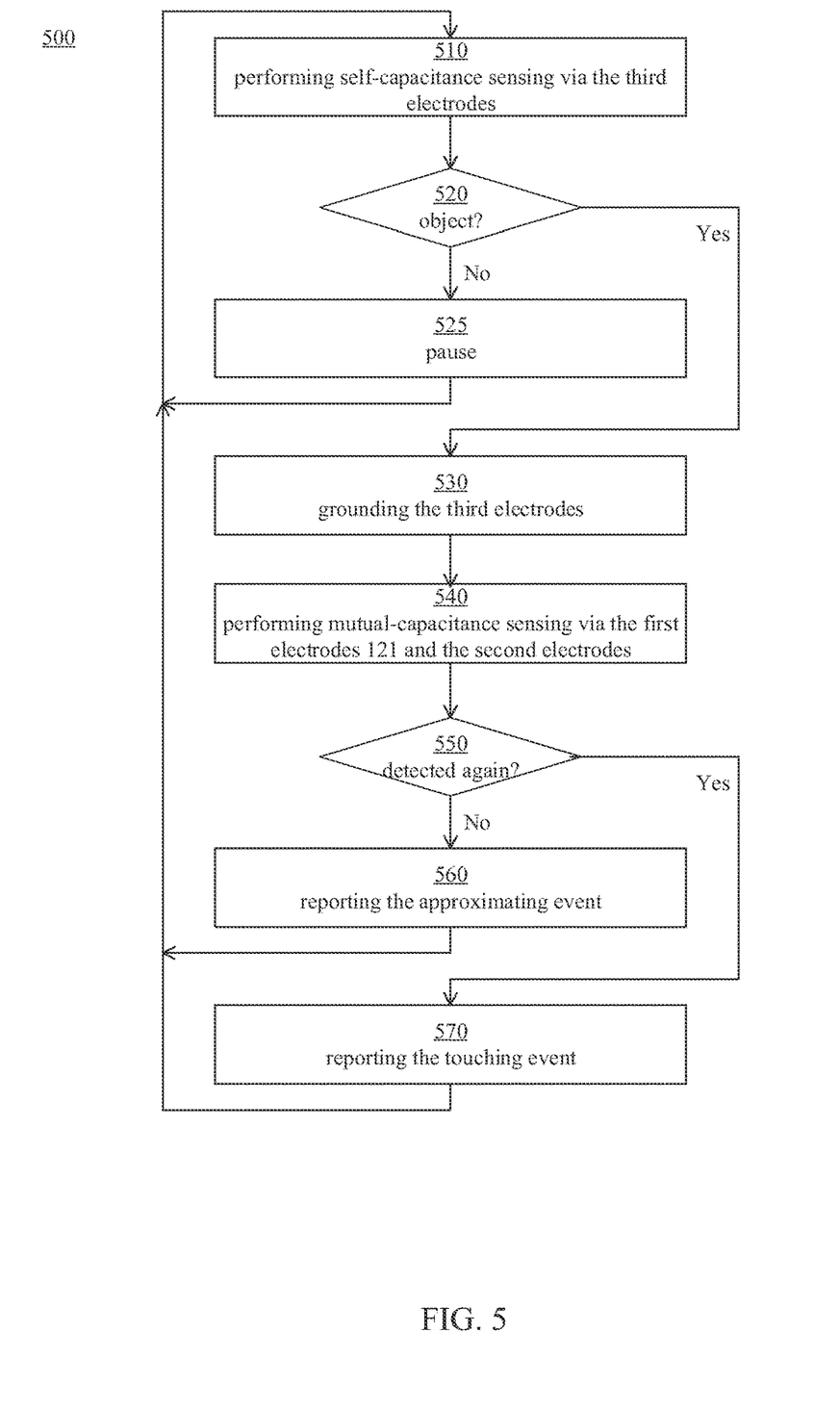
FIG. 5 depicts a flowchart diagram of a touch sensitive processing method in accordance with an embodiment of the present invention.

Please refer to FIG. 5, which depicts a flowchart diagram of a touch sensitive processing method 500 in accordance with an embodiment of the present invention. The touch sensitive processing method 500 may be implemented by the touch sensitive processing apparatus 110 which may apply to the "single routing" structure as shown in FIG. 3A and the three structures as shown in FIGS. 2A-2C, respectively. In one embodiment, the touch sensitive processing method 500 is realized by execution of a program stored in a non-volatile memory and executed by the processor module 114. Unless there exists a causal relationship, the present application does not limit execution sequence of any two steps.

Step 510: performing self-capacitance sensing via the third electrodes 123. In this step, it may have the driving circuit module 112 and the sensing circuit module 113 to perform self-capacitance sensing via one or more of the third electrodes 123 concurrently. Person having ordinary skill in the art can understand that the driving circuit module 112 may emit driving signals via each of the third electrodes 123. Simultaneously, the sensing circuit module 113 may measure the driving signals via each of the third electrodes 123. When one external conductive object 139 approximating one of the third electrodes 123, part of the driving signals induced by the third electrode 123 would be transferred to outside via the external conductive object 139. Hence, the driving signals measured via the third electrode 123 are changed accordingly.

Step 520: according to an one-dimensional array sensed by the step 510 and a base one-dimensional array which is sensed when no external conductive object approximating or touching, determining whether there is any element in the one-dimensional array changed significantly, i.e., determining whether any external conductive object approximating. If so, it is determined that an event of approximating happened, i.e., there exists an external conductive object approximating or touching the touch screen 120 nearby the third electrodes 123. Thus, the flow proceeds to step 530. When there is no element in the one-dimensional array changed significantly, it means that there is no event of approximating. Thus the flow proceeds to optional step 525 or returns back to step 510.

Optional step 525: since there is no external conductive object approximating or touching the touch screen 120, the sensing of external conductive object may be paused for a while. Then the flow returns back to step 510. In some embodiments, the step 525 may further comprise determining how many times that no external conductive object is detected. If the number exceeds a threshold, the time duration of the pause may be extended furthermore to reduce power consumption.

Step 530: grounding the third electrodes 123. In one embodiment, all of the third electrodes 123 may be grounded or connected to a certain direct current (DC) potential. In an alternative embodiment, the third electrodes 123 approximated or touched by the external conductive object 139 may be grounded or connected to a certain direct current (DC) potential.

Step 540: performing mutual-capacitance sensing via the first electrodes 121 and the second electrodes 122. In one embodiment, when all of the third electrodes 123 are grounded or connected to a certain direct current (DC) potential, person having ordinary skill in the art can understand that it may have the driving circuit module 112 takes turns to emit driving signals via the first electrodes 121 and may have the sensing circuit module 113 measures the driving signals induced by all of the second electrodes in order to get an one-dimensional array composed by multiple sensing information elements when each one of the first electrodes 121 is driven. When an external conductive object approximating or touching a point nearby an intersection of one of the first electrodes 121 and one of the second electrodes 122, the elastic dielectric layer 124 nearby the point is deformed accordingly so as the third electrodes nearby the point gets closer to the one of the second electrodes 122. Hence, part of the driving signals would be transferred to the external conductive object 139 via the grounded third electrodes 123 so as the driving signals sensed via the one of the second electrodes 122 is changed accordingly. Hence, the element of the one-dimensional array corresponding to the one of the second electrodes 122 is changed accordingly.

When each of the first electrodes 121 is driven, corresponding one-dimensional array can be measured. A two-dimensional array is composed by the multiple one-dimensional arrays according to positions of corresponding first electrodes 121. According to the two-dimensional array and a base two-dimensional array when no external conductive object 139 approximating or touching the touch screen, it may determine whether exists one or more touching events caused by one or more external conductive objects touching the touch screen 120. Each one of the touch events is corresponding to a point or a coordinate.

In an alternative embodiment, when only some of the third electrodes 123 are grounded or connected to a certain DC potential at step 530, mutual capacitance sensing may be performed at the area covered by these third electrodes 123, merely. For examples, with respect to the structures as shown in FIG. 2A or 2C, in case the first electrodes 121 and the third electrodes 123 are all in parallel to the first axis, the first electrodes 121 corresponding to the area where the third electrodes 123 are grounded can be found. Person having ordinary skilled in the art can understand that it may have the driving circuit module 112 takes turns to emit driving signals via the first electrodes 121. Similarly, by utilizing the aforementioned mutual capacitance sensing steps, a two-dimensional array corresponding to a part of the touch screen 120. Furthermore, it may determine whether exists one or more touching events caused by one or more external conductive objects touching the touch screen 120. Each one of the touch events is corresponding to a point or a coordinate.

Since different external conductive objects 139 may apply different pressures, the deformations of the elastic dielectric layer 124 may be different accordingly. When the second electrode 122 is getting closer to the third electrode 123, the change of the capacitance in between is getting larger. Hence, the pressure applied by the corresponding external conductive object 139 may be calculated according to the change of the capacitance. In one embodiment, a pressure value corresponding to each of the touching events can be calculated accordingly.

Step 550: according to the detection result got at the step 540, determining whether the touching event is detected. When the external conductive object 139 only approximates the touch screen 120 without contact, corresponding approximating event can be detected at the step 510. However, no corresponding touching event can be detected at the step 540. In this case, the flow proceeds to optional step 560 or returns to the step 510. When the corresponding approximating event is detected at the step 510 and the corresponding touching event is also detected at the step 540, the flow proceeds to the step 570.

Optional step 560: reporting the approximating event detected at the step 510 to the host 140. The approximating event reported in this step may include a position of the corresponding third electrode 123 with respect to the touch screen 120.

Step 570: reporting the touching event detected at the step 540 to the host 140. The touching event reported in this step may include its position or its coordinates. Corresponding pressure value may be also included.

Figure 6:
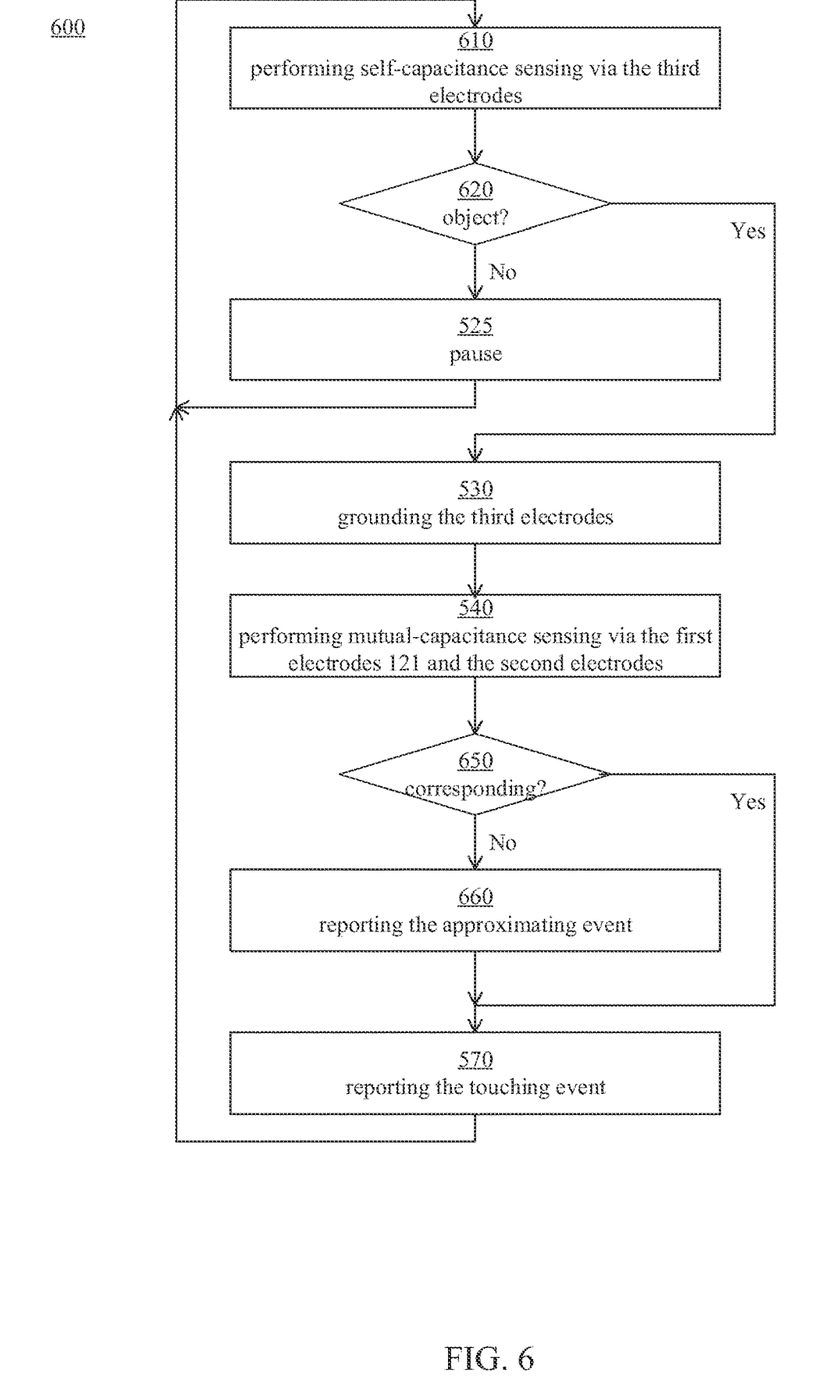
FIG. 6 depicts a flowchart diagram of a touch sensitive processing method in accordance with an embodiment of the present invention.

Please refer to FIG. 6, which shows a flowchart diagram of a touch sensitive processing method 600 in accordance with an embodiment of the present invention. The touch sensitive processing method 600 may be implemented by the touch sensitive processing apparatus 110 which may apply to the "double routing" structure as shown in FIG. 3B and the three structures as shown in FIGS. 2A-2C, respectively. In one embodiment, the touch sensitive processing method 600 is realized by execution of a program stored in a non-volatile memory and executed by the processor module 114. Unless there exists a causal relationship, the present application does not limit execution sequence of any two steps.

Step 610: performing self-capacitance sensing via the third electrodes 123. In this step, it may have the driving circuit module 112 and the sensing circuit module 113 to perform self-capacitance sensing via one or more of the third electrodes 123 concurrently. Person having ordinary skill in the art can understand that the driving circuit module 112 may emit driving signals via both ends of each of the third electrodes 123. Simultaneously, the sensing circuit module 113 may measure the driving signals via each of the third electrodes 123 to gather one-dimensional arrays including multiple sensing information elements. In other words, the sensing result corresponding to first ends of the third electrodes 123 are called first-end one-dimensional arrays. The sensing result corresponding to first ends of the third electrodes 123 are called second-end one-dimensional arrays. When one external conductive object 139 approximating one of the third electrodes 123, part of the driving signals induced by the third electrode 123 would be transferred to outside via the external conductive object 139. Hence, the driving signals measured via the third electrode 123 are changed accordingly. When the external conductive object is closer to the first end, the capacitance changes corresponding to the first-end sensing information and the second-end sensing information are different Assuming that the third electrodes 123 are in parallel to the first axis, a coordinate with respect to the first axis of the external conductive object 139 may be obtained according to differences between the first-end sensing information and the second-end sensing information. Or alternatively, a first capacitance change may be calculated according to the first-end sensing information and a base first-end sensing information, a second capacitance change may be calculated according to the second-end sensing information and a base second-end sensing information. At last, according to a difference between the first capacitance change and the second capacitance change, a coordinate value with respect to the first axis of the external conductive object 139 may be calculated accordingly.

Besides, since the multiple third electrodes are disposed along the second axis, a coordinate value with respect to the second axis of the external conductive object 139 may be calculated according to the first-end one-dimensional array and a base first-end one-dimensional array or according to the second-end one-dimensional array and a base second-end one-dimensional array.

Person having ordinary skill in the art can understand that in case two or more external conductive objects approximate the same third electrode 123, the aforementioned calculation is not appropriated to calculate positions of the approximating events. It only indicates that at least one approximating event is happened nearby the third electrode 123. In other words, the touch sensitive system provided by the present embodiment is able to detect an approximating position of a single external conductive object 139 and to detect two or more approximating positions of external conductive objects 139 which are near different third electrodes 123.

Step 620: determining whether an external conductive object approximates. If one or more approximating events are detected at step 610, it is determined that there exists at least one external conductive object 139 approximating. Thus, the flow proceeds to step 530. Otherwise, the flow proceeds to step 525.

Step 650: determining whether the approximating event is corresponding to a touching event. In theory, when a touching event is detected, there must be a corresponding approximating event detected at step 610. However, as discussed above, in case two or more external conductive objects approximate the same third electrode 123, the step 610 can only recognize that there is at least one approximating event. However, in step 540, two or more corresponding touching events may be detected. Hence, in case that the first-axis coordinate of the position of the approximating event is within a range of the first-axis coordinate of the position of the touching event, it is determined that the approximating event is corresponding to a touching event.

In this embodiment, in case that the approximating event is not being corresponding to a touching event, it implies that the external conductive object corresponding to the approximating event does not contact the touch screen 120. Hence, if so, the flow proceeds to step 660. Otherwise, the flow proceeds to step 570. In this embodiment, if a touching event is detected, its corresponding approximating event would not be reported.

Step 660: reporting the approximating event detected at step 610 to the host. As elaborated above, the touch system provided by this embodiment is able to detect one approximating position of a single external conductive object 139 and two or more approximating positions of two or more external conductive objects 139 which approximate two or more different third electrodes.

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the touch sensitive processing method further comprises reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises emitting driving signals via some of the first electrodes nearby the first approximating event and sensing the driving signals via the second electrodes in a time-sharing manner in order to get the two-dimensional array.

Preferably, in order to report a plurality of approximating or touching events, the touch sensitive processing method further comprises: when a second approximating event corresponding to a second external conductive object is detected according to the one-dimensional array and the base one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the touch sensitive processing method further comprises: detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the touch sensitive processing method further comprises calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

According to one embodiment of the present application, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first, the second and the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get an one-dimensional array composing sensing information corresponding to each of the third electrodes; detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the processor module is further configured for reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises the driving circuit module to emit driving signals via some of the first electrodes nearby the first approximating event and the sensing circuit module to sense the driving signals via the second electrodes in a time-sharing manner in order to get the two-dimensional array.

Preferably, in order to report a plurality of approximating or touching events, the processor module is further configured for: when a second approximating event corresponding to a second external conductive object is detected according to the one-dimensional array and the base one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the processor module is further configured for: detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the processor module is further configured for calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

According to an embodiment of the present invention, a touch system is provided. The touch system comprising the aforementioned touch panel and the touch sensitive processing apparatus.

According to an embodiment of the present invention, a touch sensitive processing method is provided. The touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising: performing self-capacitance sensing via the third electrodes in order to get a first one-dimensional array composing sensing information corresponding to each of first ends of the third electrodes, and performing self-capacitance sensing via the third electrodes in order to get a second one-dimensional array composing sensing information corresponding to each of second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the touch sensitive processing method further comprises: reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises emitting driving signals via some of the first electrodes nearby the first approximating event and sensing the driving signals via the second electrodes in a time-sharing manner in order to get the two-dimensional array.

Preferably, in order to report a plurality of approximating or touching events, the touch sensitive processing method further comprises: when a second approximating event corresponding to a second external conductive object is detected according to the first one-dimensional array and the second one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the touch sensitive processing method further comprises: detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the touch sensitive processing method further comprises calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

Preferably, in order to provide more information of the approximating event, the first approximating event includes a pair of coordinates with respect to the touch panel.

According to an embodiment of the present invention, a touch sensitive processing apparatus is provided. The touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising: an interconnection network module, configured to connect to one or more of the first electrodes, the second electrodes, first ends and second ends of the third electrodes; a driving circuit module, configured to transmit driving signals via the interconnection network module; a sensing circuit module, configured to sense induced driving signals via the interconnection network module; a processor module, coupled to the interconnection network module, the driving circuit module and the sensing circuit module, configured to execute instructions stored in non-volatile memory to realize following steps: have the driving circuit module and the sensing circuit module through the interconnection network performing self-capacitance sensing via the third electrodes in order to get a first one-dimensional array composing sensing information corresponding to each of the first ends of the third electrodes, and have the driving circuit module and the sensing circuit module through the interconnection network performing self-capacitance sensing via the third electrodes in order to get a second one-dimensional array composing sensing information corresponding to each of the second ends of the third electrodes; detecting a first approximating event corresponding to a first conductive object according to the first one-dimensional array and the second one-dimensional array, wherein a distance between the layer of third electrodes and the first conductive object is less than a distance between the layer of touch electrodes and first conductive object; and when the first approximating event is detected, performing following steps: have the driving circuit module and the sensing circuit module through the interconnection network performing mutual-capacitance sensing via the first electrodes and the second electrodes in order to get a two-dimensional array; detecting a first touching event corresponding to the first external conductive object according to the two-dimensional array; and reporting the first approximating event to a host when the first touching event is not detected.

Preferably, in order to report a touching event in case it is detected by the mutual-capacitance sensing, the processor module is further configured for reporting the first touching event to the host when the first touching event is detected.

Preferably, in order to accelerate the mutual-capacitance sensing according to the sensing results corresponding to the third electrodes, the third electrodes are in parallel to the first axis, the mutual-capacitance sensing step comprises the driving circuit module to emit driving signals via some of the first electrodes nearby the first approximating event and the sensing circuit module to sense the driving signals via the second electrodes in a time-sharing manner in order to get the two-dimensional array.

Preferably, in order to report a plurality of approximating or touching events, the processor module is further configured for when a second approximating event corresponding to a second external conductive object is detected according to the first one-dimensional array and the second one-dimensional array, detecting a second touching event corresponding to the second external conductive object according to the two-dimensional array; reporting the second approximating event to the host when the second touching event is not detected; and reporting the second touching event to the host when the second touching event is detected, wherein the first approximating event and the second approximating event are corresponding to different third electrodes.

Preferably, in order to detect multiple external conductive objects nearby the same third electrode, the processor module is further configured for detecting a second touching event corresponding to a second external conductive object according to the two-dimensional array; determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

Preferably, in order to calculate a pressure value corresponding to the touching event by considering compression degree of the elastic dielectric layer, the processor module is further configured for calculating a pressure value corresponding to the first touching event according to elements of the two-dimensional array corresponding to the first touching event.

Preferably, in order to dissipate charges of the driving signals to the external conductive object via the first electrodes and the third electrodes, a total area of the third electrodes is more than 80% of an area of the touch panel.

Preferably, in order to provide more information of the approximating event, the first approximating event includes a pair of coordinates with respect to the touch panel.

According to an embodiment of the present invention, a touch system is provided. The touch system comprising the aforementioned touch panel and the touch sensitive processing apparatus.

The touch system, the touch sensitive processing apparatus and method provided by the present application can distinguish whether the external conductive object approximates or contacts the touch screen so as the host can increase types of responsive activities with respect to different kinds of input corresponding to one position. Thus, the functionalities of the touch system are increased to enrich user's experience.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive method comprising:

performing self-capacitance sensing via the third electrodes in order to get an one-dimensional array composing sensing information corresponding to each of the third electrodes;

detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps:

performing mutual-capacitance sensing via the first electrodes and the second electrodes in order to get a two-dimensional array;

detecting a first touching event corresponding to the first external conductive object according to the two-dimensional array; and reporting the first approximating event to a host when the first touching event is not detected.

2. The touch sensitive processing method as claimed in claim 1, further comprises:

reporting the first touching event to the host when the first touching event is detected.

3. The touch sensitive processing method as claimed in claim 1, wherein the third electrodes are in parallel to the first axis, the mutual-capacitance sensing step comprises emitting driving signals via some of the first electrodes nearby the first approximating event and sensing the driving signals via the second electrodes in a time-sharing manner in order to get the two-dimensional array.

4. The touch sensitive processing method as claimed in claim 1, further comprises:

when a second approximating event corresponding to a second external conductive object is detected according to the one-dimensional array and the base one-dimensional array, detecting a second touching event corresponding to the second external conductive object according to the two-dimensional array;

reporting the second approximating event to the host when the second touching event is not detected; and reporting the second touching event to the host when the second touching event is detected, wherein the first approximating event and the second approximating event are corresponding to different third electrodes.

5. The touch sensitive processing method as claimed in claim 2, further comprises:

detecting a second touching event corresponding to a second external conductive object according to the two-dimensional array;

determining whether the first touching event and the second touching event are corresponding to one of the third electrodes corresponding to the first approximating event; and reporting the second touching event to the host when it is determined that the first touching event and the second touching event are corresponding to one of the third electrodes corresponding to the first approximating event.

6. The touch sensitive processing method as claimed in claim 2, further comprises:

calculating a pressure value corresponding to the first touching event according to elements of the two-dimensional array corresponding to the first touching event.

7. The touch sensitive processing method as claimed in claim 1, wherein a total area of the third electrodes is more than 80% of an area of the touch panel.

8. A touch sensitive processing apparatus applicable to a touch panel which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes, wherein the touch sensitive apparatus comprising:

an interconnection network module, configured to connect to one or more of the first, the second and the third electrodes;

a driving circuit module, configured to transmit driving signals via the interconnection network module;

a sensing circuit module, configured to sense induced driving signals via the interconnection network module;

a processor module, coupled to the interconnection network module, the driving circuit module and the sensing circuit module, configured to execute instructions stored in non-volatile memory to realize following steps:

have the driving circuit module and the sensing circuit module through the interconnection network performing self-capacitance sensing via the third electrodes in order to get an one-dimensional array composing sensing information corresponding to each of the third electrodes;

detecting a first approximating event corresponding to a first conductive object according to the one-dimensional array and a base one-dimensional array, wherein a distance between the layer of third electrodes and the first conductive object is less than a distance between the layer of touch electrodes and first conductive object; and when the first approximating event is detected, performing following steps:
  have the driving circuit module and the sensing circuit module through the interconnection network performing mutual-capacitance sensing via the first electrodes and the second electrodes in order to get a two-dimensional array;
  detecting a first touching event corresponding to the first external conductive object according to the two-dimensional array; and
  reporting the first approximating event to a host when the first touching event is not detected.

9. The touch sensitive processing apparatus as claimed in claim 8, wherein the processor module is further configured for reporting the first touching event to the host when the first touching event is detected.

10. The touch sensitive processing apparatus as claimed in claim 8, wherein the third electrodes are in parallel to the first axis, the mutual-capacitance sensing step comprises the driving circuit module to emit driving signals via some of the first electrodes nearby the first approximating event and the sensing circuit module to sense the driving signals via the second electrodes in a time-sharing manner in order to get the two-dimensional array.

11. The touch sensitive processing apparatus as claimed in claim 8, wherein the processor module is further configured for:
  when a second approximating event corresponding to a second external conductive object is detected according to the one-dimensional array and the base one-dimensional array, detecting a second touching event corresponding to the second external conductive object according to the two-dimensional array;
  reporting the second approximating event to the host when the second touching event is not detected; and
  reporting the second touching event to the host when the second touching event is detected,
  wherein the first approximating event and the second approximating event are corresponding to different third electrodes.

12. The touch sensitive processing apparatus as claimed in claim 9, wherein the processor module is further configured for:
  detecting a second touching event corresponding to a second external conductive object according to the two-dimensional array;
  determining whether the first touching event and the second touching event are corresponding to one of the third electrodes corresponding to the first approximating event; and
  reporting the second touching event to the host when it is determined that the first touching event and the second touching event are corresponding to one of the third electrodes corresponding to the first approximating event.

13. The touch sensitive processing apparatus as claimed in claim 9, wherein the processor module is further configured for calculating a pressure value corresponding to the first touching event according to elements of the two-dimensional array corresponding to the first touching event.

14. The touch sensitive processing apparatus as claimed in claim 8, wherein a total area of the third electrodes is more than 80% of an area of the touch panel.

15. A touch system, comprising:
  a touch panel, which sequentially includes a layer of third electrodes, an elastic dielectric layer and at least one layer of touch electrodes, wherein the layer of third electrodes includes multiple parallel third electrodes, the at least one layer of touch electrodes includes multiple first electrodes in parallel to a first axis and multiple second electrodes in parallel to a second axis, each of the first electrode intersects with the second electrodes; and
  a touch sensitive apparatus comprising:
    an interconnection network module, configured to connect to one or more of the first, the second and the third electrodes;
    a driving circuit module, configured to transmit driving signals via the interconnection network module;
    a sensing circuit module, configured to sense induced driving signals via the interconnection network module;
    a processor module, coupled to the interconnection network module, the driving circuit module and the sensing circuit module, configured to execute instructions stored in non-volatile memory to realize following steps:
      have the driving circuit module and the sensing circuit module through the interconnection network performing self-capacitance sensing via the third electrodes in order to get an one-dimensional array composing sensing information corresponding to each of the third electrodes;
      detecting a first approximating event corresponding to a first conductive object according to the one-dimensional array and a base one-dimensional array, wherein a distance between the layer of third electrodes and the first conductive object is less than a distance between the layer of touch electrodes and first conductive object; and
      when the first approximating event is detected, performing following steps:
        have the driving circuit module and the sensing circuit module through the interconnection network performing mutual-capacitance sensing via the first electrodes and the second electrodes in order to get a two-dimensional array;
        detecting a first touching event corresponding to the first external conductive object according to the two-dimensional array; and
        reporting the first approximating event to a host when the first touching event is not detected.

* * * * *